March 25, 1958    F. A. DE PUYDT ET AL    2,828,051
LAWN TENDING CART
Filed July 15, 1954    3 Sheets-Sheet 2
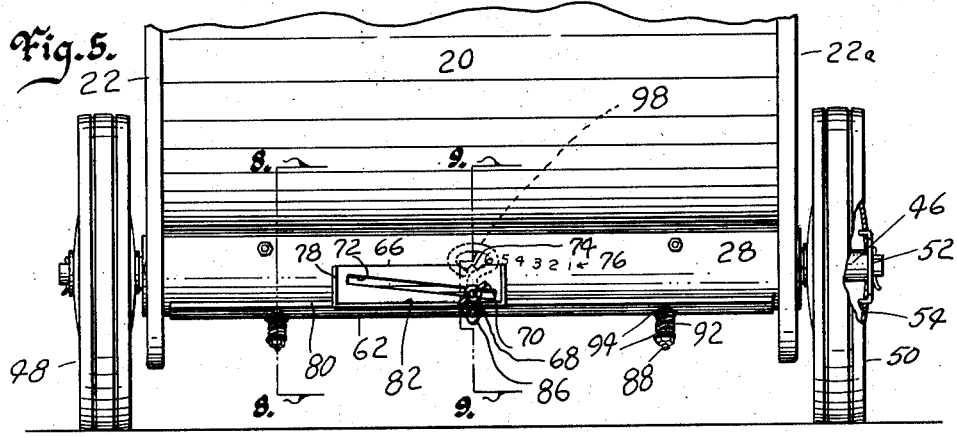
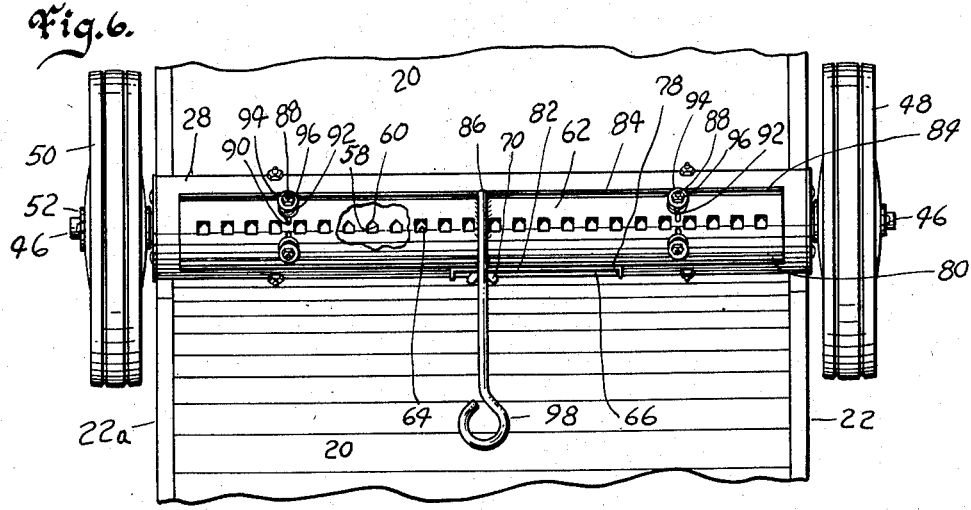
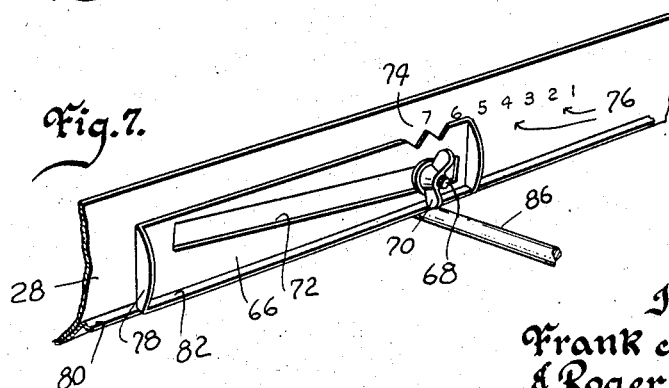
Inventors
Frank A. DePuydt
& Roger C. Silver
by Lendrum A. MacEachron
Attorney
Witness
Edward P. Seeley March 25, 1958  F. A. DE PUYDT ET AL  2,828,051
LAWN TENDING CART
Filed July 15, 1954  3 Sheets-Sheet 3
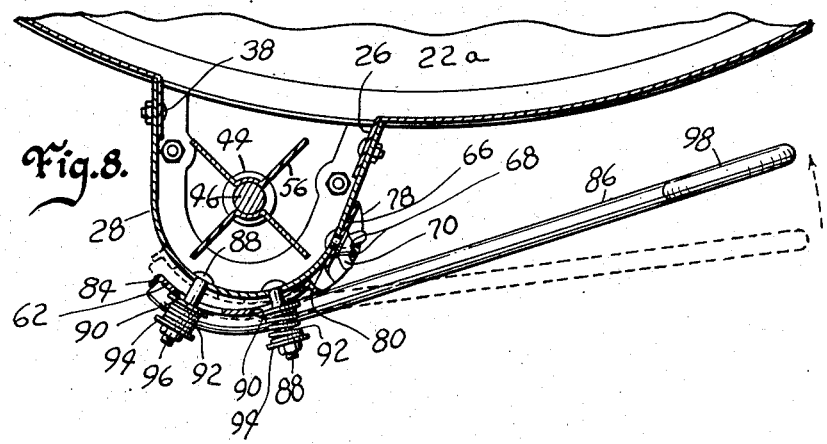
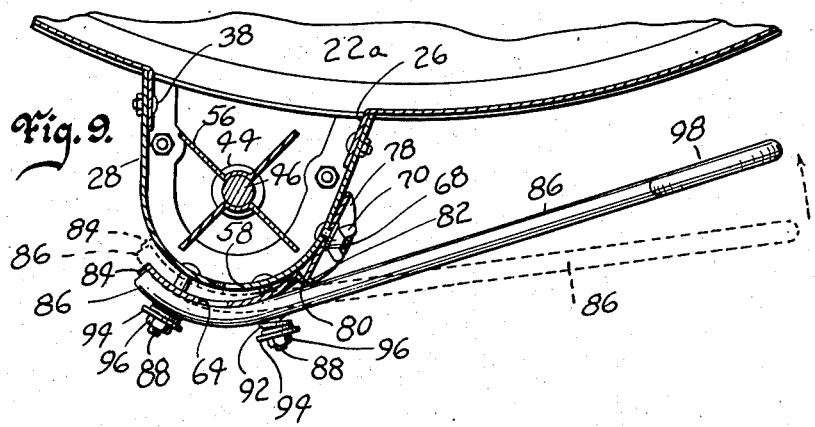
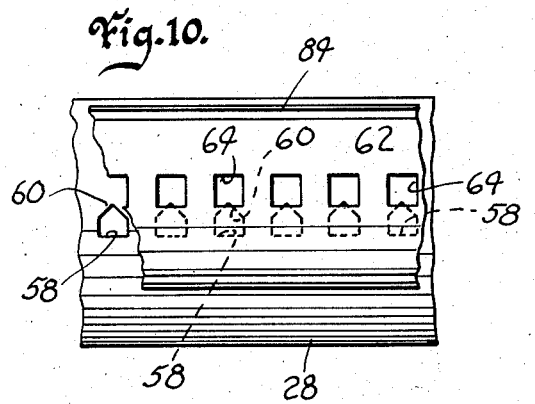
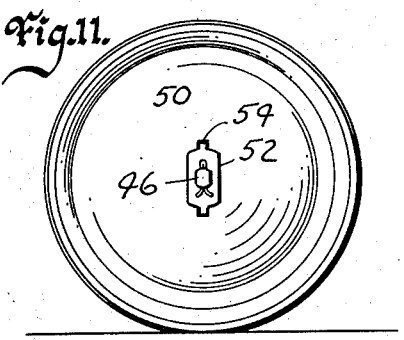
Inventors
Frank A. DePuydt
& Roger C. Silver
by Lendrum A. MacEachron
Attorney
Witness
Edward P. Seeley

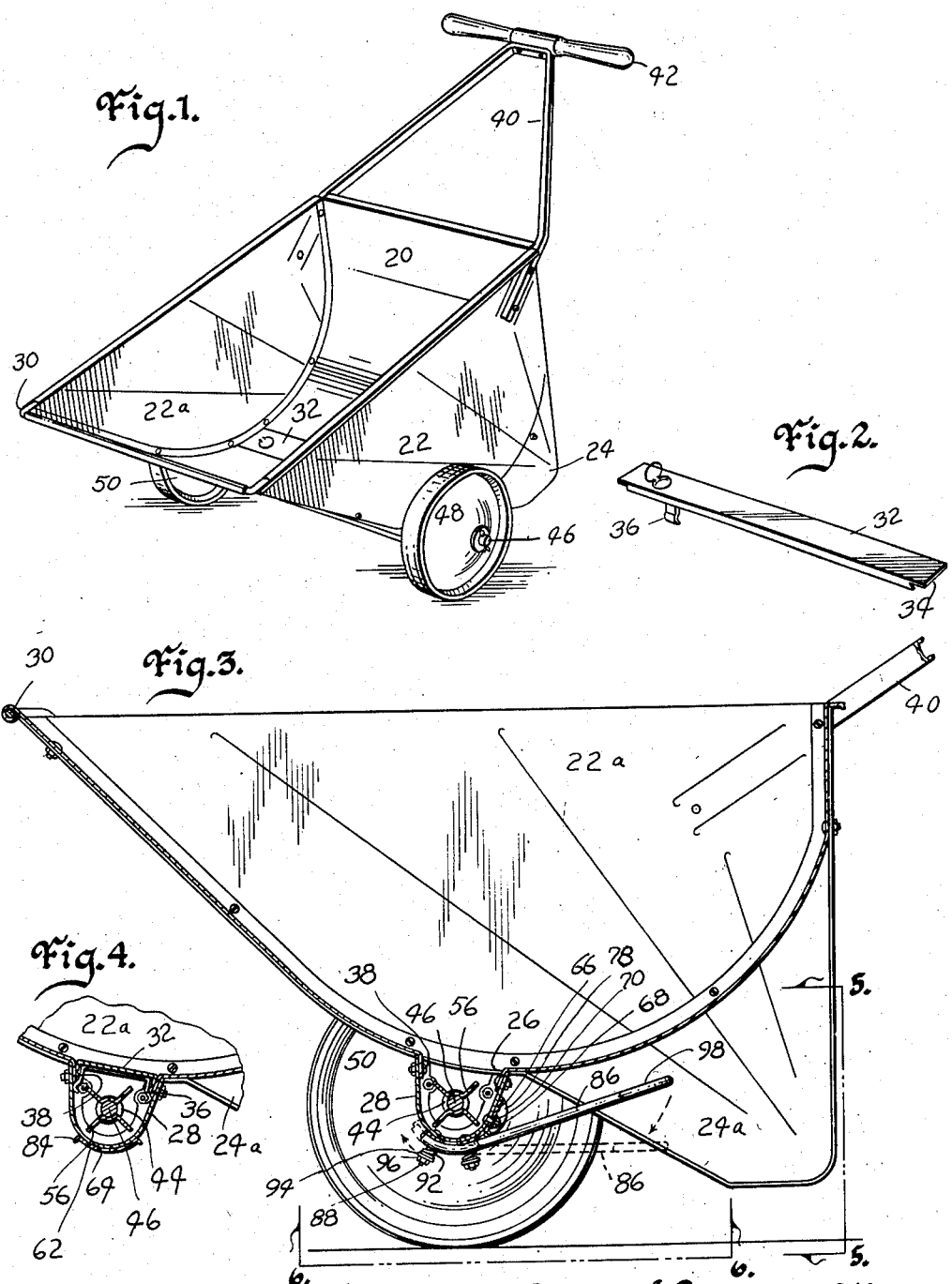

United States Patent Office 2,828,051
Patented Mar. 25, 1958

2,828,051

LAWN TENDING CART

Frank A. De Puydt and Roger C. Silver, Des Moines, Iowa

Application July 15, 1954, Serial No. 443,666

8 Claims. (Cl. 222—41)

Our invention is a lawn tending cart that will perform the functions of a cart, a seeder or a fertilizer spreader. It is so constructed and arranged as to be changed from one into another of the functions it performs very rapidly and easily. Our device is also provided with a gate to control the size of the openings for the seeder and spreader functions that is resiliently and yieldingly held against the vehicle so that jams of material being dispensed which often happens with fertilizer can be cleared. We have also employed a gate stop in the seeder and spreader structure that makes it possible for one gate to serve for both purposes. Further we have provided means for easily and quickly connecting and disconnecting the agitator for the seeder and spreader from its source of driving power. In summary, then, of this very brief description of our invention the objects of our invention are to provide a lawn tending car that:

(1) Is readily converted from one of its use to any other of its uses.

(2) Has a gate for controlling the openings of the dispensing mechanism that will operate well for both seeding and spreading.

(3) Has a dispensing mechanism that can be cleared of jams easily.

(4) Has a simple stop mechanism to determine the position of the gate for rapid adjustment of the gate to the proper opening for known work.

(5) Has a wheel driven agitator that is easily connected and disconnected.

(6) Can be used as a cart without disconnecting the agitator.

(7) Has a gate that moves in the direction of the line of travel of the vehicle to adjust the openings of the dispensing mechanism.

(8) Has structure that makes it possible to urge material in the car to and into the dispensing mechanism.

(9) Is very inexpensive to manufacture and produce for the market in view of the several functions of the device. While these specific objects are the principal ones of our invention, it is our intention to include as objects of our invention any such that may be apparent to one skilled in the art after he has read this specification, including the claims, and examined the accompanied drawings which are briefly described as follows:

Fig. 1 is a perspective view of our lawn tending cart.

Fig. 2 is an enlarged perspective view of the cover plate for the depending dispensing mechanism.

Fig. 3 is a longitudinal sectional view of our lawn tending cart drawn to a larger scale than that used in Fig. 2. Broken lines show adjusted positions of parts.

Fig. 4 is a detail view of the agitator shown in section and drawn to the same scale as that used in Fig. 3 but with the dispenser cover plate shown in place. Portions of the structure are omitted in the interests of clarity.

Fig. 5 is a fragmentary rear elevation view of our lawn tending cart drawn to the same scale as Fig. 3. A portion of the device is deleted to show the gate stop clearly. Broken lines show the missing parts.

Fig. 6 is a fragmentary bottom view of our lawn tending cart drawn to the same scale as Fig. 3 with portions of the gate broken away to illustrate the construction of the dispensing mechanism more fully.

Fig. 7 is a detail perspective view of the gate stop of our lawn tending cart drawn to a larger scale than that used in Fig. 3.

Fig. 8 is a fragmentary sectional view of the agitator and gate structure of the dispensing mechanism drawn to the scale used in Fig. 7 and taken on the line 8—8 of Fig. 5. Broken lines illustrate the normal position of the gate adjacent the dispensing trough.

Fig. 9 is a view similar to that in Fig. 8, drawn to the same scale, but taken on the line 9—9 of Fig. 5. Broken lines again illustrate the normal position of the gate.

Fig. 10 is a fragmentary bottom view of the gate and agitator trough like housing of our lawn tending cart. It is drawn to about the same scale as Figures 8 and 9 with broken lines showing hidden parts.

Fig. 11 is a side elevation of one wheel of our lawn tending cart drawn to the scale used in Fig. 3.

We turn now to a detailed description of the structures we created to solve the problems outlined above. In the drawings accompanying this specification, a given reference number always designates the same or substantially identical parts. We have used the number 20 to designate the slanted front and curved hopper body bottom to which the sides 22 and 22a are secured to form the complete hopper body. Sides 22 and 22a are continued below the curve of the bottom at the rear to form the supporting legs 24 and 24a. These legs are also used to jar material down the slope of the slanted front of the hopper body to urge material clinging to the front into the opening 26. This opening is arranged at the bottom of the front slope of the body bottom and is the opening into the trough-like housing 28 of the dispensing mechanism. The top edge of the body is rolled and reinforced in a conventional manner as at 30 in Figures 1 and 3. Openings 26 may be covered when it is desired to use the vehicle as a cart. A cover plate 32 which has a conventional folding ring handle is used for this purpose. The tongue 34 is used to secure one end of the plate 32, and the other end is held in place in the cart by the spring catches 36. These spring catches engage any suitable projection such as the bolt heads 38 when the plate is in place as shown in Fig. 4. The plate can be inserted and removed at will and very easily. The agitator described below is contained entirely within the housing 28 and will not engage the plate 32. A handle brace designated 40 is secured to the upper rear portions of the cart and supports the handle grip member designated 42. All of the described body members are held together in any suitable conventional manner as by nut and bolt assemblies.

The sides of the dispenser housing 28 are the supports for bearings 44 in which are journalled the axle 46. Wheel 48 is loosely rotatable on the axle while the wheel 50 is secured to the axle selectively in a manner similar to that of wheel 48 or connected thereto with the key 52 so that rotation of the wheel 50 is imparted to the axle. The key has a flat sided hole in it so that it always rotates with the axle which has a flat sided end to fit in the key. The key is also provided with the fingers 54 that are eccentric of said flat sided hole and that enter appropriately formed holes eccentrically positioned relative to the journal in the wheel 50 when the key is placed on the axle with the fingers pointing in toward the wheel 50 as shown in Fig. 5. When the fingers are inserted in the eccentrically positioned holes in the wheel, the axle and the wheel are locked together for rotational motion. If the vehicle is to be used as a cart exclusively over a long period of time, however, the key can be removed and turned around so that the fingers 54 point out away from the wheel. With the key positioned as last described, the wheel 50 is freely journaled on the axle 46. This reduces wear on the agitating mechanism when it is not being used, as the agitator will rotate and wear only if the wheel 50 and the axle 46 are locked together by means of the fingers 54 of key 52 entering the eccentric holes in the wheel 50.

The dispensing mechanism is confined to a space below the top of housing 28 so that the plate 32 can be used to convert the cart into a solid bottomed material transporting unit without any necessity of disconnecting the axle from the wheel 50. If this were not true, much time would be wasted in converting the vehicle from its use as a seeder or spreader to its use as a cart and vice-versa. When the unit is used for one of these purposes for only a short time, this easy conversion back to another form is a great boon. Contained entirely within the housing 28 is the agitator which consists of the double vanes 56 that are secured to the axle 46. When the wheel 50 is connected to the axle, any normal movement of the cart over a surface will impart movement to the agitator. Movement of the agitator causes the material in the housing 28 to be disturbed and as much of it as is permitted escapes through the openings 58. These openings are pointed on one end as at 60 and shown most clearly in Fig. 10. A gate designated 62 has a plurality of openings in it designated 64. The gate openings present a straight side to the points of the openings 58. The straight edges of the gate openings can be moved to and from the points of the housing openings to form triangular openings of various sizes or even larger five-sided figures. The former are used for fine materials such as seed while the latter are used with fertilizer.

A simple stop plate 66 is slidably mounted on the rear of the body by means of the stud 68 extending through the diagonal slot 72. A wing nut designated 70 may be loosened or tightened selectively to permit the plate to be moved or to lock it in place respectively. As the plate 66 is moved laterally on the stud, there is longitudinal movement of the plate also which adjusts the stop for various gate openings. A pointer 74 secured to the plate and spaced indicia marked on the body permit resetting the stop to any known advantageous setting for particular work. The indicia are designated 76. Shoulders 78 formed on the stop make it easy to move laterally on the stud 68. A flange on the stop designated 82 engages the rear flange 80 of the gate 62. The gate 62 also has a front flange 84 for added rigidity. As a means to facilitate sliding the gate 62 over the housing 28, a handle 86 is rigidly secured to the gate. This sliding movement of the gate is possible, because the gate is held to the housing by the long bolts 88 extending through the housing and the slots 90 in the gate. Resilient elements such as the springs 92 that embrace the bolts between the washers 94 are secured to the bolts and hence the housing by the nuts 96. The springs engage and bear on the gate 62 to hold it against the housing 28. The gate is held yieldingly and can be moved back and forth over the surface of the housing within the limitations of slots 90 and in the direction of the normal movement of the cart over a surface. To further facilitate the rearward sliding movement of the gate 62, the handle 86 is provided with the grip 98 here shown for simplicity as a ring. Because the gate is held against the housing 28 only yieldingly by springs 92, furthermore, it can also be moved as shown in Figures 8 and 9 which tips the forward edge of gate 62 away from housing 28 by compressing the front springs 92 as shown in Fig. 8. In that figure the front (left hand) spring 92 is compressed and the back one (right hand) is not. If handle 86 is suddenly released, the gate is snapped against the housing 28 by the expansion of the front springs. By pushing down on handle 86, movement of the gate in a manner similar to that shown in Figures 8 and 9 but in the opposite direction is had.

To clear jams of fertilizer, the gate is rocked back and forth by pushing down and lifting up on handle 86 or by springing the gate in one direction and letting it snap back under spring tension. Commercial fertilizers pack rather easily on the long forward slope of the cart body also. Materials that have packed there can be brought down and into the opening 26 by jarring the hopper body. We have provided structure that makes this jarring easily done. In the first place we positioned the opening 26 at the base of the sloping front instead of at what might be considered the center of the bottom; that is a point midway between the termination of the front and back. Since the opening 26 is at the base of the sloping front, a jar administered to the hopper body by banging the supporting legs 24 and 24a on the ground or other supporting surface will tend to force packed material down and into the opening 26. Any material that is clinging to the rear of the hopper body can be shaken loose by the same jarring. It may then be necessary to tip the body forward to throw the loosened material from the back on to the front slope and then down into the dispenser. All this movement of the material can be done, however, without any tool separate from the cart being involved.

We have disclosed our invention in the foregoing specification wherein we have recited the general structure to carry our invention into effect and have shown the preferred, though not exclusive, practical embodiment of it. We now specifically claim and thereby particularly point out what we believe to be our invention.

We claim:

1. In a lawn tending cart; a hopper body having a slanted front; said hopper body having an opening in the bottom thereof at the base of the slanted front thereof; a trough-like housing secured over said hopper body opening; said trough-like housing having openings in the bottom thereof; long bolts secured to said trough-like housing; a transversely slotted gate having its slots embracing said long bolts; coil springs embracing said long bolts and engaging said gate; nuts on said long bolts to secure said springs thereon; said gate presenting openings to the openings in said trough-like housing; a handle secured to said gate for over-powering said springs to move alternately the front and rear edges of said gate away from said trough-like housing; an axle journalled in the sides of said trough-like housing; vanes secured to said axle; said vanes being contained entirely within said trough-like housing; a cover plate for closing the opening in the bottom of said hopper body at will; a pair of wheels journaled on said axle; means for interconnecting one of said wheels to said axle for simultaneous rotation therewith and disconnecting said wheel from said axle selectively for rotation of said wheel on said axle independently of rotation of said axle.

2. A lawn tending cart having a hopper body carrying a trough-like housing with openings therein through which lawn tending materials are dispensed; a gate moveably secured to said trough-like housing for increasing and decreasing selectively the effective size of the openings in said trough-like housing; said gate also being resiliently mounted on said trough-like housing; and means secured to said gate for overpowering the resilient mounting of said gate and moving, alternately, opposing edges of said gate away from said trough-like housing at will.

3. The lawn tending cart of claim 2 in which said gate is also slidably secured to said trough-like housing for reciprocal movement in the direction of normal movement of said cart over a surface.

4. The lawn tending cart of claim 3 in which an axle is journalled in said trough like housing; an agitator is secured to said axle; said axle having at least one flattened end; a key having a flat sided hole therein fitting on the flattened end of said axle; a wheel on said axle; said wheel having at least one hole therein eccentric of its journal;

said key having a finger thereon adapted to fitting in the eccentrically positioned hole in said wheel and being withdrawn therefrom selectively.

5. The lawn tending cart of claim 4 in which a stud is secured to said trough like housing near said gate; a plate having a diagonal slot therein slidably mounted on said stud; and a nut on said stud for clamping said plate at will to immobilize it.

6. The lawn tending cart of claim 5 in which a pointed means is formed on said plate; and spaced indicia are marked on said trough like housing adjacent said plate.

7. The lawn tending cart of claim 2 in which said resilient mounting for said gate consists of; bolts secured to said trough like housing; springs secured to said bolts and engaging said gate; and said means secured to said gate for overpowering said springs at will is rigid; whereby leverage can be applied to said gate to tip alternately the front and rear edges of said gate away from said trough like housing.

8. The lawn tending cart of claim 2 in which an axle is journalled in said trough like housing; an agitator is secured to said axle; said axle having at least one flattened end; a key having a flat sided hole therein fitting on the flattened end of said axle; a wheel on said axle; said wheel having at least one hole eccentric to its journal therein; said key having a finger thereon adapted to fit in the eccentrically positioned hole in said wheel and be withdrawn therefrom selectively.

References Cited in the file of this patent

UNITED STATES PATENTS

| | | |
|---|---|---|
| 752,190 | Tieman | Feb. 16, 1904 |
| 1,015,969 | McCrary | Jan. 30, 1912 |
| 1,888,821 | Fearn | Nov. 22, 1932 |
| 2,661,125 | Gandrud | Dec. 1, 1953 |
| 2,667,286 | Raught | Jan. 26, 1954 |
| 2,678,145 | Juzwiak et al. | May 11, 1954 |
| 2,737,317 | Gustison | Mar. 6, 1956 |

FOREIGN PATENTS

| | | |
|---|---|---|
| 470,062 | Italy | Mar. 18, 1952 |